US010963392B1

(12) United States Patent
Gupta et al.

(10) Patent No.: US 10,963,392 B1
(45) Date of Patent: Mar. 30, 2021

(54) VICTIM ALLOCATIONS IN SHARED SYSTEM CACHE

(71) Applicant: Apple Inc., Cupertino, CA (US)

(72) Inventors: Sandeep Gupta, Santa Clara, CA (US); Perumal R. Subramoniam, San Jose, CA (US)

(73) Assignee: Apple Inc., Cupertino, CA (US)

( * ) Notice: Subject to any disclaimer, the term of this patent is extended or adjusted under 35 U.S.C. 154(b) by 11 days.

(21) Appl. No.: 16/048,645

(22) Filed: Jul. 30, 2018

(51) Int. Cl.
G06F 12/0891 (2016.01)
G06F 12/0862 (2016.01)
G06F 12/0888 (2016.01)

(52) U.S. Cl.
CPC ...... *G06F 12/0891* (2013.01); *G06F 12/0862* (2013.01); *G06F 12/0888* (2013.01); *G06F 2212/1021* (2013.01); *G06F 2212/602* (2013.01)

(58) Field of Classification Search
CPC ............. G06F 12/0891; G06F 12/0862; G06F 12/0888; G06F 2212/1021; G06F 2212/602; G06F 2212/6026; G06F 2212/6028; G06F 2212/1024; G06F 2212/283
See application file for complete search history.

(56) References Cited

U.S. PATENT DOCUMENTS

| 8,972,700 | B2 | 3/2015 | Tran | |
|---|---|---|---|---|
| 9,135,179 | B2 | 9/2015 | Wang | |
| 9,558,001 | B2 | 1/2017 | Khot et al. | |
| 2006/0090036 | A1* | 4/2006 | Zohar | G06F 12/0866 711/133 |
| 2008/0059707 | A1* | 3/2008 | Makineni | G06F 12/0897 711/122 |
| 2014/0052927 | A1* | 2/2014 | McCauley | G06F 12/0862 711/137 |
| 2017/0060581 | A1 | 3/2017 | Patil | |
| 2017/0293565 | A1* | 10/2017 | Priyadarshi | G06F 12/0811 |
| 2018/0165214 | A1* | 6/2018 | Farmahini Farahani | G06F 12/0888 |

(Continued)

OTHER PUBLICATIONS

Gaur, J., Chaudhuri, M. and S. Subramoney, "Bypass and Insertion Algorithms for Exclusive Last-level Caches," International Symposium on Computer Architecture, 2011.*

(Continued)

*Primary Examiner* — Tracy A Warren
(74) *Attorney, Agent, or Firm* — Kowert Hood Munyon Rankin and Goetzel PC; Rory D. Rankin

(57) ABSTRACT

A system and method for efficiently handling data selected for eviction in a computing system. In various embodiments, a computing system includes one or more processors, a system memory, and a victim cache. The cache controller of a particular cache in a cache memory subsystem includes an allocator for determining whether to allocate data evicted from the particular cache into the victim cache. The data fetched into the first cache includes data fetched to service miss requests, which includes demand requests and prefetch requests. To determine whether to allocate, the allocator determines whether a usefulness of data fetched into the particular cache exceeds a threshold. If so, the evicted data is stored in the victim cache. If not, the evicted data bypasses the victim cache. Data determined to be accessed by a processor is deemed to be of a higher usefulness.

20 Claims, 7 Drawing Sheets

(56) References Cited

U.S. PATENT DOCUMENTS

2019/0065377 A1* 2/2019 Lee .................... G06F 12/0862
2019/0073305 A1* 3/2019 Hijaz ................. G06F 12/0848

OTHER PUBLICATIONS

Kharbutli, M., Jarrah, M., and Y. Jararweh, "SCIP: Selective Cache Insertion and Bypassing to Improve the Performance of Last-Level Caches," IEEE Jordon Conference on Applied Electrical Engineering and Computing Technologies (AEECT), 2013.*

Duong, N., Cammarota, R., Zhao, D., Kim, T., and A. Veidenbaum, "SCORE: A Score-Based Memory Cache Replacement Policy," JWAC 2020—1st JILP Workshop on Computer Architecture Competitions: cache replacement Championship.*

* cited by examiner

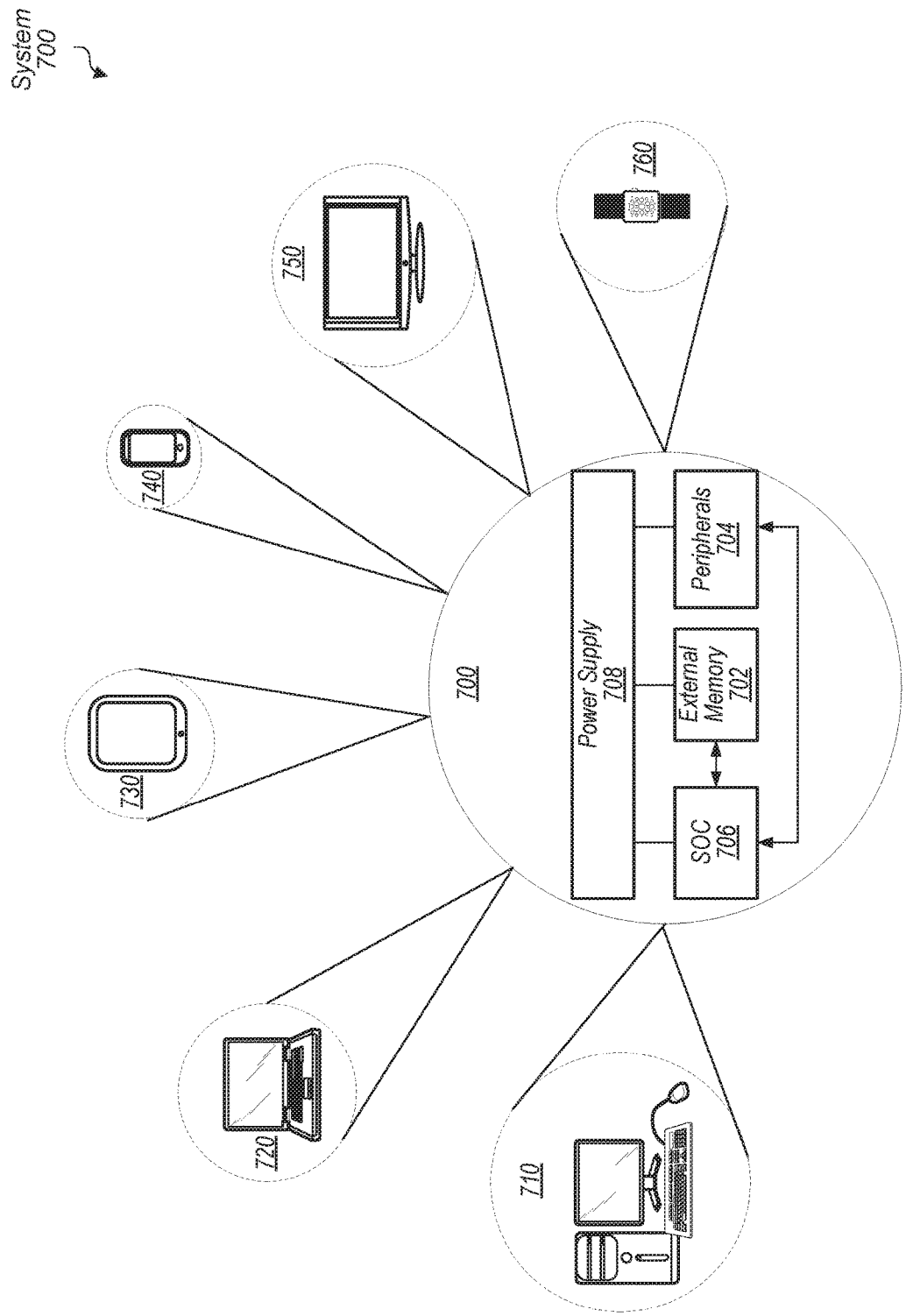

VICTIM ALLOCATIONS IN SHARED SYSTEM CACHE

BACKGROUND

Technical Field

Embodiments described herein relate to the field of computing systems and, more particularly, to efficiently handling data evicted from processor complexes.

Description of the Related Art

Generally speaking, a variety of computing systems include multiple processors and a memory, and the processors generate access requests for instructions and application data while processing software applications. The processors include one or more of a central processing unit (CPU), data parallel processors like graphics processing units (GPUs), digital signal processors (DSPs), multimedia engines, and so forth.

Computing systems often include two or three levels of cache hierarchy for the multiple processors. Later levels in the hierarchy of the system memory include access via a memory controller to system memory such as dynamic random-access memory (DRAM) and dual in-line memory modules (dimms). Below the system memory is non-volatile data storage such as one or more of a hard disk and a solid state disk. In many cases, the memory controller for the system memory includes a shared system cache for the multiple processors. In other cases, the shared system cache is located externally from this memory controller and includes a separate shared cache controller. Data from recently accessed memory locations are stored within the caches. When the data is requested again, the data is retrieved from the caches rather than from system memory.

As the size of the shared system cache increases, more data is stored and the processors are able to retrieve requested data without the longer latency of accessing the system memory. However, the size of the shared system cache is limited by the available on-chip area, and design constraints such as at least the length of word lines and data lines due to noise analysis and timing delays. Therefore, not all data retrieved from system memory is stored in the shared system cache.

Further, when a processor evicts data, if all of the evicted data is stored in the shared system cache, this same data is later evicted from the shared system cache due to cache capacity misses and cache conflict misses. When any cache is not able to hold all requested data and continually replaces stored data, and many times before it is requested again, the cache is described as "thrashing." When the shared system cache thrashes, one or more of the multiple processors now access system memory for requested data. Accesses to system memory include larger latencies and larger power consumption than accessing the closer shared system cache.

In view of the above, efficient methods and mechanisms for efficiently handling data evicted from processors in a computing system are desired.

SUMMARY

Systems and methods for efficiently handling data evicted from processors in a computing system are contemplated. In various embodiments, a computing system includes one or more processors, a system memory and a victim cache. In various embodiments, the computing system uses a cache memory subsystem, which includes a first cache. In some embodiments, the first cache is a last level cache, which is the highest level cache below the victim cache and the system memory. In various embodiments, the cache controller of the first cache includes an allocator for determining whether to allocate data evicted from the first cache into the victim cache.

In various embodiments, the data fetched into the first cache includes data fetched to service miss requests, which includes both demand requests and prefetch requests. To determine whether to allocate data evicted from the first cache into the victim cache, the allocator determines whether a usefulness of data fetched into the first cache exceeds a threshold. If so, the evicted data is stored in the victim cache. If not, the evicted data bypasses the victim cache.

In various embodiments, the usefulness of data fetched into the first cache is deemed to be higher if it has been accessed by a processor and it is deemed to be usefulness if it has not been accessed by the processor. To determine the usefulness of data fetched into the first cache, in some embodiments, one or more factors are compared to corresponding thresholds. One example of such a factor is a number of miss requests, which is compared to a first threshold. A second example of such a factor is a number of evictions of dirty data, which is compared to a second threshold. A third example of such a factor is a prefetch accuracy, which is compared to a third threshold. A fourth example of such a factor is an amount of data to fetch in outstanding miss requests with a streaming hint, which is compared to a fourth threshold.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which:

FIG. 7 is a block diagram of one embodiment of a system.

Figure 1:
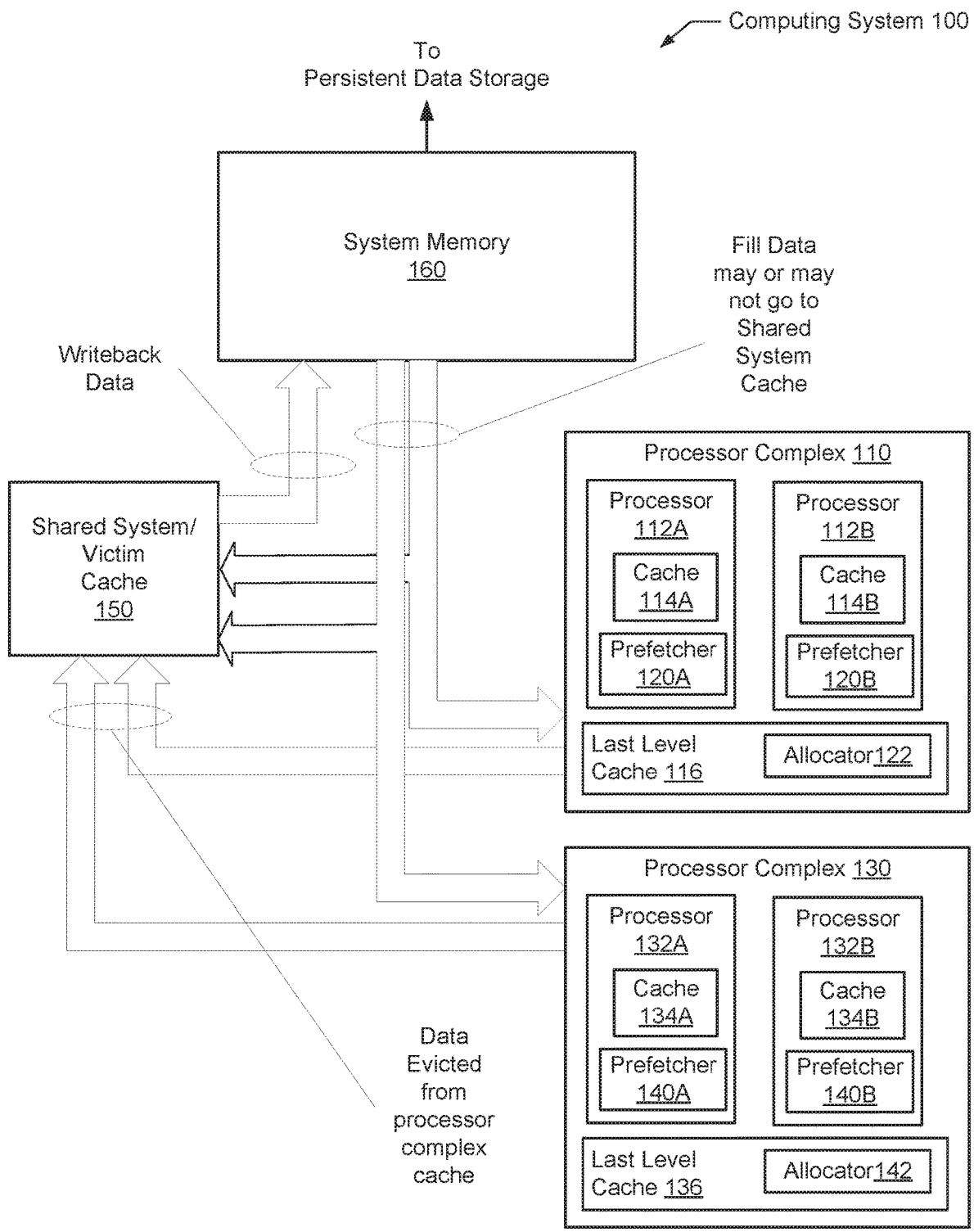
FIG. 1 is a block diagram of one embodiment of a computing system.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring to FIG. 1, a generalized block diagram of one embodiment of a computing system 100 is shown. In the illustrated embodiment, two processor complexes 110 and 130 transfer commands, messages, data corresponding to the commands and messages, probes, interrupts, and so forth to one another and to system memory 160 and shared system/victim cache 150. Shared system/victim cache 150 is also referred to as a higher level cache since it is at a higher level in the cache memory subsystem than the last level caches 116 and 136. In various embodiments, shared system/victim cache 150 (or cache 150) is used as a victim cache for data evicted from processor complexes 110 and 130.

In various embodiments, the computing system 100 is a system on a chip (SoC) that includes multiple types of integrated circuits on a single semiconductor die, each integrated circuit providing a separate functionality. In other embodiments, the multiple functional units are individual dies within a package, such as a multi-chip module (MCM). In yet other embodiments, the multiple functional units are individual dies or chips on a printed circuit board. Clock sources, such as phase lock loops (PLLs), interrupt controllers, power manager, a communication fabric, and input/output (I/O) manager and so forth are not shown in FIG. 1 for ease of illustration. It is also noted that the number of components of the computing system 100 (and the number of subcomponents for those shown in FIG. 1, such as within each of the processor complexes 110 and 130), vary from embodiment to embodiment. In other embodiments, there are more or fewer of each component/subcomponent than the number shown for the computing system 100.

Although a communication fabric or other interconnect is not shown, in the illustrated embodiment, multiple logical paths are shown. In various embodiments, each logical path uses a same communication fabric or other selected interconnect. For example, in some embodiments, cache fill responses used to service cache misses are sent from system memory 160 to one or more of processor complexes 110 and 130, and not to cache 150 (i.e., they are not also stored in the cache 150). In other embodiments, cache fill responses are sent to from system memory 160 to one or more of processor complexes 110 and 130, and to shared system cache 150. Although not explicitly shown, shared system cache 150 is also capable of providing instructions and data in cache fill responses to one or more of processor complexes 110 and 130. Evicted data from last level caches 116 and 136 are shown to be sent from processor complexes 110 and 130 to shared system cache 150. In various embodiments, the evicted data includes both clean (unmodified) evicted data and dirty (modified) evicted data. Writeback data is shown to be sent from higher level cache 150 to system memory 160.

The term "processor complex" is used to denote a configuration of one or more processor cores using local storage (not shown), such as a local shared cache memory subsystem, and capable of processing a workload together. Although only two processor complexes are shown, in other embodiments, another number of processor complexes are in computing system 100. In some embodiments, components within processor complex 130 are similar to components in processor complex 110. In other embodiments, components in processor complex 130 are designed for lower power consumption, and therefore, include control logic and processing capability producing less performance. In such embodiments, supported clock frequencies are less than supported clock frequencies in processor complex 110. In addition, one or more of the processor cores in processor complex 130 include a smaller number of execution pipelines and/or functional blocks for processing relatively high power consuming instructions than what is supported by the processor cores in processor complex 110.

In an embodiment, processor complex 130 has a similar configuration as processor complex 110 although differences may be found in one or more of the microarchitecture of processors 132A-132B, the size of the last level cache 136, and so forth. In some embodiments, the processors 112A-112B use a homogeneous architecture. For example, each of the processors 112A-112B is a general-purpose processor, such as a central processing unit (CPU), which utilizes circuitry for executing instructions according to a predefined general-purpose instruction set. Any of a variety of instruction set architectures (ISAs) is selected. In some embodiments, each core within processors 112A-112B supports the out-of-order execution of one or more threads of a software process and include a multi-stage pipeline. In various embodiments, the processors 112A-112B may support the execution of a variety of operating systems (not shown).

In some embodiments, the processors 112A-112B use a heterogeneous architecture. In such embodiments, one or more of the processors 112A-112B is a highly parallel data architected processor, rather than a CPU. In some embodiments, these other processors of the processors 112A-112B use single instruction multiple data (SIMD) cores. Examples of SIMD cores are graphics processing units (GPUs), digital signal processing (DSP) cores, multimedia engines, or otherwise. In various embodiments, each of processor complexes 110 and 130 includes one or more levels of a cache memory subsystem. In an embodiment, processor cores include one or more on-die levels (L1, L2, L3 and so forth) of caches for accessing data and instructions. In some embodiments, the last level cache 116 is a shared off-die level two (L2) cache for the processors 112A-112B although an L3 cache is also possible and contemplated. Similarly, in some embodiments, last level cache 136 is a shared off-die level two (L2) cache for the processors 132A-132B.

In processor complex 110, data from recently accessed memory locations are stored within the on-die caches or in the off-die last level cache 116. When the data is requested again, the data is retrieved from one of these caches rather than from shared system cache 150 or system memory 160. If a requested block, which is also referred to as a cache line, is not found in the on-die caches or in the off-die last level cache 116, then a fetch (read) request for the missing block is generated and transmitted to one or more of shared system cache 150 and system memory 160 via a memory interface.

In various embodiments, fetch (read) requests sent from processor complex 110 include demand requests, which are requests generated by one of processors 112A-112B during the processing of applications. For example, front-end pipeline logic in processors 112A-112B updates a program counter (PC) used for fetching requested instructions during the processing of applications. In addition, execution units in processors 112A-112B generate addresses used for fetching requested data during the processing of applications. Additionally, in various embodiments, fetch requests sent from processor complex 110 include prefetch requests, which are requests generated by one of prefetchers 120A-120B as a speculative read request based on predictions using a history of one or more previous demand requests and other prefetch requests. In the illustrated embodiment, processors 112A-112B include prefetchers 120A-120B for requesting one or more of instructions and data with prefetch requests as a prediction prior to processors 112A-112B possibly requesting the instructions and data with demand requests. Therefore, when the predictions are correct, fetch latencies are reduced by moving the needed data closer to the requesting processor in advance, which improves performance. Processor complex 130 includes prefetchers 140A-140B in processors 132A-132B for similar purposes. In various embodiments, prefetchers 120A-120B and 140A-140B predict memory locations for upcoming requests with sequential, stride and other access patterns.

In some embodiments, system memory 160 includes access via a memory controller (not shown) to one of a variety of types of dynamic random-access memory (DRAM), such as synchronous DRAM (SDRAM), other type of RAM, on-die flash memory, dual in-line memory modules (dimms) and so forth. Below system memory 160 in a memory subsystem is persistent data storage such as one or more of a hard disk and a solid state disk. Persistent storage is one or more types of a variety of data storage devices that retain data storage after a power supply to that device is turned off. Persistent data storage is also referred to as non-volatile data storage.

In some embodiments, shared system cache 150 includes access via a cache controller (not shown) to one of a variety of types of synchronous random-access memory (SRAM), such as synchronous DRAM (SDRAM) or other type of RAM. In some embodiments, shared system cache 150 is located in a memory controller for system memory 160. In other embodiments, shared system cache 150 is located externally from the memory controller for system memory 160. In some embodiments, instructions and data for cache fill responses used to service cache misses are sent from system memory 160 to only one or more of processor complexes 110 and 130, and not to shared system cache 150. In other embodiments, cache fill responses are also sent to shared system cache 150. Although both instructions and data are transferred by cache fill responses, only "data" is indicated in computing system 100 for ease of illustration. Shared system cache 150 is also capable of providing instructions and data in cache fill responses to one or more of processor complexes 110 and 130. In fact, accesses to shared system cache 150 have lower latency and power consumption than accesses to system memory 160. Therefore, in some embodiments, accesses to shared system cache 150 are preferred, but the size limit of shared system cache 150 disallows all requested data to be stored. Therefore, accesses to system memory 160 for requested data still occurs.

When one or more of processor complexes 110 and 130 process instructions of software applications, at some point, data is evicted from one of the last level caches 116 and 136 within the processor complex. If all of the evicted data is stored in shared system cache 150, then this same data is later evicted from shared system cache 150 due to cache capacity misses and cache conflict misses. Again, cache 150 has a limited size. When any cache is not able to hold all requested data and repeatedly evicts and reallocates, the cache is described as "thrashing." When cache 150 thrashes, in some embodiments, one or more of processors 112A-112B and 132A-132B are required to access system memory 160 more often for requested instructions and data. In such cases, performance decreases and power consumption increases.

In various embodiments, rather than allocate all evicted data to cache 150, each of allocators 122 and 142 within last level caches 116 and 136 selectively determines whether to allocate evicted instructions and/or data into the cache 150. In various embodiments, the determination of whether to allocate evicted instructions and data in cache 150 is based on a variety of factors. In various embodiments, this variety of factors also determines usefulness of data fetched into the cache 150. The data fetched into the last level caches 116 and 136 includes data fetched to service miss requests. As described earlier, miss requests include both demand requests and prefetch requests. For ease of discussion, the "usefulness" of data fetched into the last level caches 116 and 136 is considered to include comparison of one or more of these variety of factors to corresponding thresholds. One example of such a factor is whether a total number of miss requests exceeds a first threshold. If so, then the usefulness of data fetched into a corresponding one of the last level caches 116 and 136 is deemed to be of a lower usefulness. In contrast, if the total number of miss requests does not exceed the first threshold, then the usefulness of data fetched into the corresponding one of the last level caches 116 and 136 is deemed to be of a higher usefulness.

A second example of such a factor is whether a number of evictions of dirty data exceeds a second threshold. If so, then the usefulness of data fetched into a corresponding one of the last level caches 116 and 136 is deemed to be of a lower usefulness. In contrast, if the number of evictions of dirty data does not exceed the second threshold, then the usefulness of data fetched into the corresponding one of the last level caches 116 and 136 is deemed to be of a higher usefulness. A third example of such a factor is whether a prefetch accuracy is less than a third threshold. In some embodiments, the prefetch accuracy is determined to be a ratio of an amount of prefetched data demanded (i.e., hit upon by a demand request) from a particular cache, such as one of the last level caches 116 and 136, by a processor to an amount of data prefetched into the particular cache. If the prefetch accuracy for one of the last level caches 116 and 136 is less than the third threshold, then the usefulness of data fetched into the one of the last level caches 116 and 136 is deemed to be of a lower usefulness. In contrast, if the prefetch accuracy is not less than the third threshold, then the usefulness of data fetched into the one of the last level caches 116 and 136 is deemed to be of a higher usefulness.

In various embodiments, a prefetch request includes a hint that a corresponding one of prefetchers 120A-120B and 140A-140B that generated the prefetch request is performing prefetch streaming. A prefetch stream includes a stream of prefetch requests with sequential memory addresses, memory address strides, or other pattern used by the prefetch logic for a given starting memory address. In some embodiments, the hint is a bit in the prefetch request that is asserted or negated by the corresponding one of prefetchers 120A-120B and 140A-140B. The miss requests include a first number of prefetch requests. A second number, which is a subset of the first number, includes prefetch requests, which are also miss requests, with an asserted streaming hint. A fourth example of such a factor for determining whether to allocate evicted instructions and data in cache 150 is whether this second number exceeds a fourth threshold. If so, then the usefulness of data fetched into a corresponding one of the last level caches 116 and 136 is deemed to be of a lower usefulness. In contrast, if this second number does not exceed the fourth threshold, then the usefulness of data fetched into the corresponding one of the last level caches 116 and 136 is deemed to be of a higher usefulness. In various embodiments, based on one or more of the above comparisons, when it is determined the usefulness of fetched data exceeds a threshold, evicted data is allocated (stored) in the cache 150. In contrast, when it is determined the usefulness of fetched data does not exceed a threshold, allocation of evicted data into the cache 150 is prevented.

In an embodiment, allocator 122 uses separate thresholds for a number of demand requests from processors 112A-112B and for a number of prefetch requests from processors 112A-112B. Similarly, allocator 142 uses separate thresholds for a number of demand requests from processors 132A-132B and for a number of prefetch requests from processors 132A-132B. In some embodiments, a particular bit in, or otherwise associated with, a cache line is used to indicate whether the data in the cache line is associated with a prefetch request. The particular bit is also referred to as a "prefetch bit". In one embodiment, when the prefetch bit is asserted, the data in the cache line is associated with a prefetch request. Conversely, when the prefetch bit is negated, the data in the cache line is associated with a demand request rather than a prefetch request. In some embodiments, the prefetch bit is stored with the tag of the cache line. In other embodiments, the prefetch bit is stored elsewhere. In some embodiments, prefetchers 120A-120B and 140A-140B are configured to assert a prefetch bit for data retrieved responsive to a prefetch request.

When a prefetch request is sent from prefetcher 120A to the last level cache 116 and the prefetch request misses in last level cache 116, a miss request is sent (e.g., from last level cache 116) to one or more of the cache 150 and the system memory 160. The requested cache line is then returned and stored in the last level cache 116 and the prefetch bit is asserted to indicate that the requested cache line corresponds to a prefetch request. In various embodiments, a first value is used to track a total number of prefetch requests brought into the last level cache 116 and a second value is used to track a number of demand requests that hit on prefetched data in the cache 116. If a demand request is sent to last level cache 116 and hits on a cache line that was prefetched, then the second value is incremented and the prefetch bit in the given cache line is negated so that the cache line is identified as corresponding to a demand request instead of a prefetch request. When prefetched data is hit upon by a demand request, the prediction by one of the prefetchers 120A-120B and 140A-140B that the prefetched data will be needed is deemed correct. In addition, in some embodiments, the updated prefetch bit is used at the time of eviction. For example, in an embodiment, prefetch data that is not accessed by a processor is discarded when selected for eviction. In another embodiment, the determination of what to do with the prefetch data that is not accessed by a processor is handled by later logic. In various embodiments, an accuracy of prefetches may be calculated based on a ratio of the second value to the first value. If allocator 122 determines the prefetch accuracy is below a threshold, then in an embodiment, processor complex 110 disables allocation of evicted data to the cache 150. In various embodiments, allocator 142 in processor complex 130 performs similar steps.

In some embodiments, each of the processor complexes 110 and 130 is coupled through a communication channel subsystem to other components. In some embodiments, processor complexes 110 and 130 transfer messages and data to one another and to shared system cache 150 and system memory 160 through a communication fabric, and each of the processor complexes 110 and 130 includes a fabric interface unit. Different types of traffic flows independently through a communication fabric. In some embodiments, a communication fabric utilizes a single physical fabric bus to include a number of overlaying virtual channels, or dedicated source and destination buffers, each carrying a different type of traffic. Each channel is independently flow controlled with no dependence between transactions in different channels. In other embodiments, the communication fabric is packet-based, and may be hierarchical with bridges, cross bar, point-to-point, or other interconnects.

In some embodiments, allocators 122 and 142 insert an indication with evicted data (clean or dirty) that is sent to a communication fabric or other interconnect. If allocators 122 and 142 determine conditions do not permit allocating the evicted data into the shared system cache 150, then allocators 122 and 142 set the indication to specify evicted dirty data is not be allocated in the cache 150. In an embodiment, when the conditions do not permit allocating evicted data in shared system cache 150, clean evicted data is simply discarded and overwritten in last level cache 116 or 136 with no transaction being conveyed from processor complexes 110 and 130. If allocators 122 and 142 determine the conditions permit allocating evicted data in shared system cache 150, then allocators 122 and 142 set the indication to specify allocating evicted data (clean or dirty) into shared system cache 150.

Figure 2:
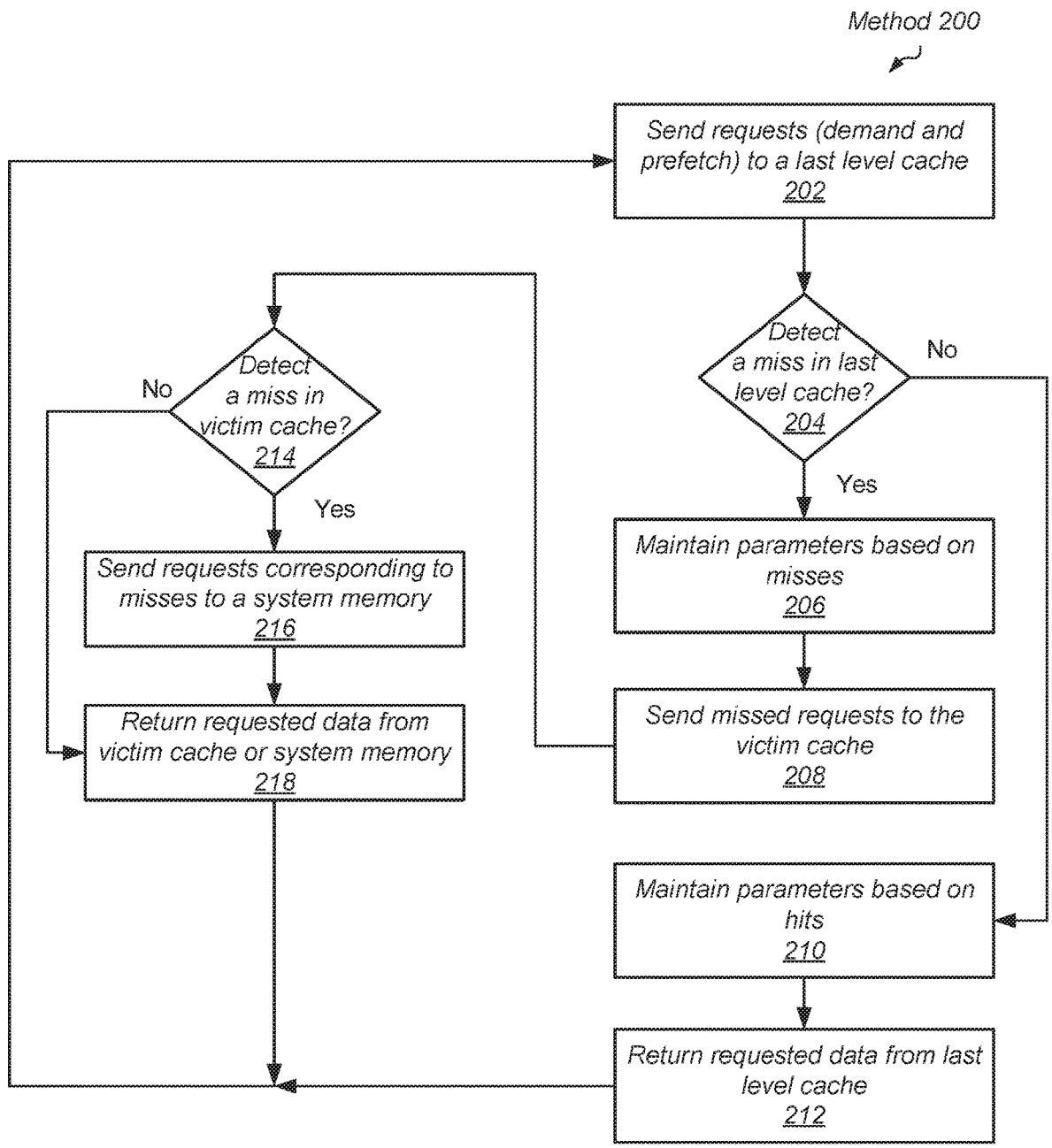
FIG. 2 is a flow diagram of one embodiment of a method for handling memory access requests.

Referring now to FIG. 2, a generalized flow diagram of one embodiment of a method 200 for processing memory access requests is shown. For purposes of discussion, the steps in this embodiment (as well as for FIGS. 3-4 and 7) are shown in sequential order. However, in other embodiments some steps may occur in a different order than shown, some steps may be performed concurrently, some steps may be combined with other steps, and some steps may be absent.

In various embodiments, memory access requests are sent to a last level cache (block 202). In various embodiments, the memory access requests include demand requests and prefetch requests. For example, a processor generates memory access requests during the processing of applications and sends these requests as demand requests to a cache memory subsystem. When the requested data is not found in the lower levels of the cache memory subsystem, the demand requests are sent to the last level cache. In some embodiments, prefetch requests are generated by a prefetcher in a processing unit and sent from the processing unit to the last level cache in a processor complex. The prefetchers generate prefetch requests as speculative read requests based on predictions as to what the processor will need (e.g., using a history of one or more previous demand requests and/or other factors). In various embodiments, prefetchers predict memory locations for upcoming prefetch requests based on sequential, stride, and other access patterns.

If a cache miss occurs due to the data being targeted by the request not being found in the last level cache ("yes" branch of the conditional block 204), then an indication of a cache miss is generated and parameters are maintained based on the miss (block 206). For example, a total number of miss requests is maintained. As described earlier, another number of miss requests, which are prefetch requests with an asserted streaming hint, is also maintained. The corresponding miss request is sent from the last level cache to a victim cache (block 208) to determine if the requested data is present in the victim cache.

In various embodiments, the victim cache is a higher level cache than the last level cache in the processing unit. In some embodiments, the victim cache is a shared system cache, which is accessed by multiple processing units. In other embodiments, the victim cache is a shared system cache, which is accessed by multiple processors within a single processing unit. In some embodiments, the processing unit is a processor complex. If a cache miss occurs due to the data targeted by the miss request from the processing unit not being in the victim cache ("yes" branch of the conditional block 214), then an indication of a cache miss is generated and the corresponding miss request is sent from the victim cache to a system memory (block 216). The miss request is serviced by the memory controller for the system memory and the requested data is returned from the system memory (block 218). If the data targeted by the miss request from the processing unit is found in the victim cache (i.e., it hits on the victim cache) ("no" branch of the conditional block 214), then the requested data is retrieved and returned from the victim cache (block 218).

In various embodiments, the parameters maintained in the above blocks 206 and 210 of method 200 are used for determining whether allocation of evicted data in the victim cache is prevented. Therefore, resources are used for providing fetched data from both demand requests and prefetch requests to the last level cache, rather than used for providing evicted data to the victim cache. In various embodiments, the maintained parameters are compared to corresponding thresholds. In some embodiments, a count of a number of parameters exceeding a corresponding threshold is maintained. If the count exceeds a count threshold, then in an embodiment evicted data is prevented from being allocated in the victim cache. In an embodiment, the count threshold is one. In other embodiments, the count threshold is any one of another non-zero, positive values.

In some embodiments, one or more of the maintained parameters and the results of the comparisons are weighted and combined by any one of a variety of formulas such as a weighted sum. In an embodiment, when a given comparison generates a logic true result, a corresponding non-zero, positive value is added to a sum. For example, when it is determined that the number of miss requests exceeds a first threshold, the comparison generates a logic true result and a corresponding non-zero, positive value is added to the sum. In one embodiment, the value of 10 is added to the sum. In another embodiment, the value of 35 is added to the sum. In another example, when it is determined that the prefetch accuracy exceeds a second threshold, the comparison generates a logic true result and a corresponding non-zero, positive value is added to the sum. In one embodiment, the value of 20 is added to the sum. In another embodiment, the value of 40 is added to the sum.

In an embodiment, when the given comparison generates a logic false result, a zero value is added to the sum. It is noted when a positive value of 1 is used in the sum for logic true results and the value of 0 is used in the sum for logic false results, the weight sum reduces to a count, which was described earlier in the above description for the count threshold. In another embodiment, when the given comparison generates a logic false result, a non-zero, positive value less than a value used for a logic true result is added to the sum. For example, when it is determined that the number of miss requests does not exceed the first threshold, the comparison generates a logic false result and a value of 3 is added to the sum. The value of 3 is less than the value of 10 used for the logic true result for this particular comparison.

In various embodiments, the sum has an inverse relationship with the usefulness of data fetched into the last level cache. The higher the value of the sum, the lower the usefulness of the data fetched into the last level cache. In contrast, the lower the value of the sum, the higher the usefulness of the data fetched into the last level cache. In an embodiment, the sum is compared to a threshold. If the sum exceeds the threshold, then the usefulness of data fetched into the last level cache does not exceed a corresponding threshold, and evicted data is prevented from being stored in the victim cache. If the sum does not exceed the threshold, then the usefulness of data fetched into the last level cache exceeds its corresponding threshold, and evicted data is allocated (stored) in the victim cache. Therefore, the result of the combination and comparison determines whether evicted data is to be allocated into the victim cache.

Control logic implemented by hardware, software, or both determines whether to allocate data evicted from the last level cache to the higher level victim cached based on usefulness of data fetched into the last level cache. The data fetched into the last level cache includes data fetched to service miss requests. As described earlier, miss requests include both demand requests and prefetch requests. The usefulness of the data fetched into the last level cache is considered to be of a higher usefulness if the data has been accessed by a processor. If the data has not been accessed, then the usefulness of the data fetched into the last level cache is considered to be of a lower usefulness.

Figure 3:
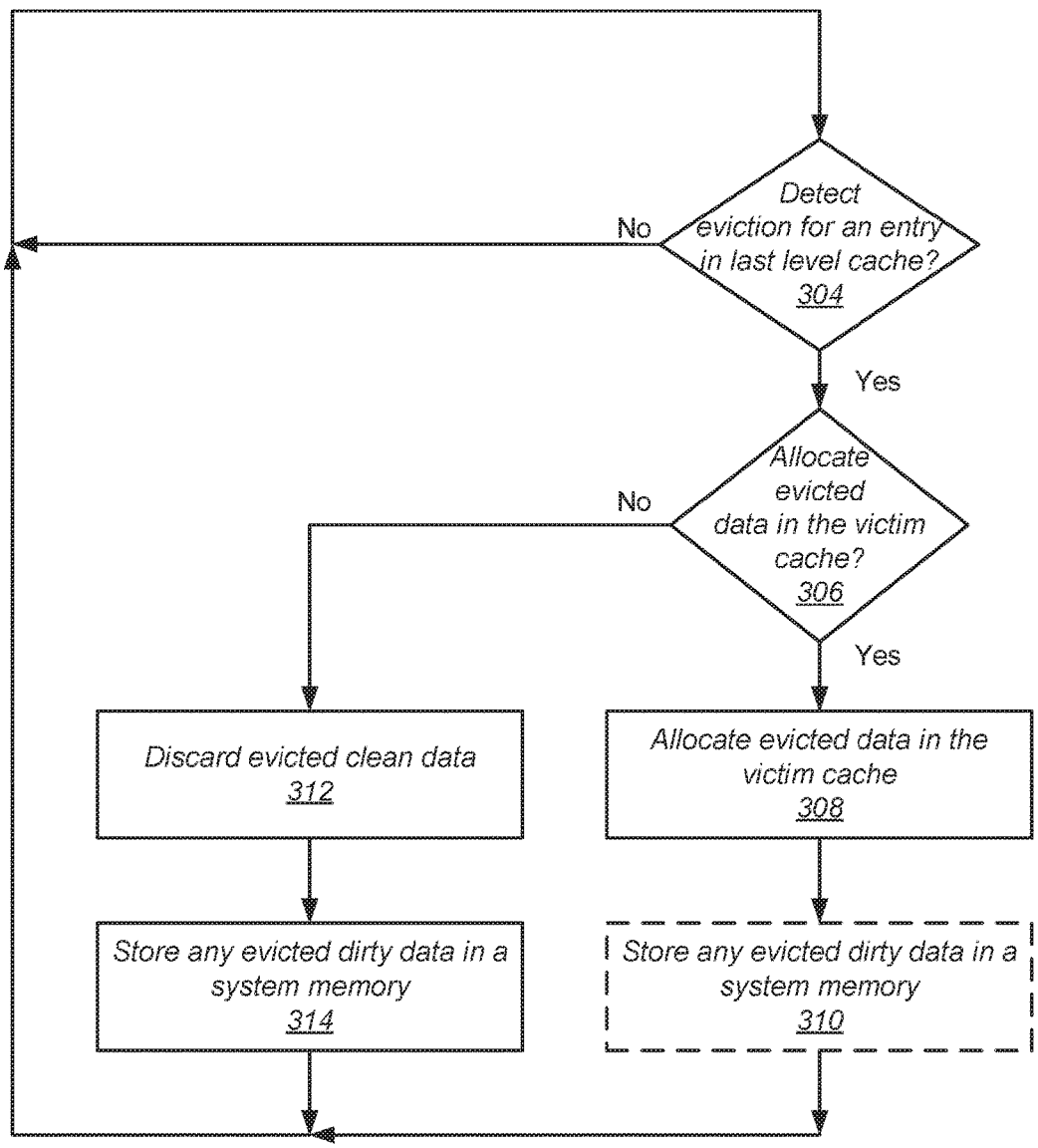
FIG. 3 is a flow diagram of one embodiment of a method for handling evicted data.

Referring now to FIG. 3, a generalized flow diagram of one embodiment of a method 300 for handling evicted data is shown. In some embodiments, a shared system cache also selectively serves as a victim cache. The victim cache is a higher level cache than the last level cache. As shown, it is determined in conditional block 304 whether data in an entry of a last level cache is selected for eviction. If it is detected that an entry in a last level cache is marked for eviction ("yes" branch of the conditional block 304), and it is determined evicted data is to be allocated in the victim cache ("yes" branch of the conditional block 306), then evicted data is allocated in the victim cache (block 308). As described earlier, in various embodiments, to determine whether evicted data is to be allocated in the victim cache, parameters are maintained and compared to corresponding thresholds. Examples of the parameters include a number of miss requests, a number or a size of dirty evicted data, a prefetch accuracy and a number of miss requests that are prefetch requests with an asserted prefetch streaming hint.

In some embodiments, a count of a number of parameters exceeding a corresponding threshold is maintained. If the count exceeds a count threshold, such as one, then evicted data is prevented from being allocated in the victim cache. In other embodiments, the comparison results using the parameters are weighted and combined by any one of a variety of formulas such as a weighted sum. In some embodiments, evicted dirty data is also allocated in system memory (block 310). In other embodiments, evicted data is only allocated in the victim cache. If it is detected that an entry in a last level cache is marked for eviction ("yes" branch of the conditional block 304), but it is determined evicted data is not to be allocated in the victim cache ("no" branch of the conditional block 306), then evicted clean data is discarded (block 312). Evicted dirty data is allocated in system memory (block 314).

Figure 4:
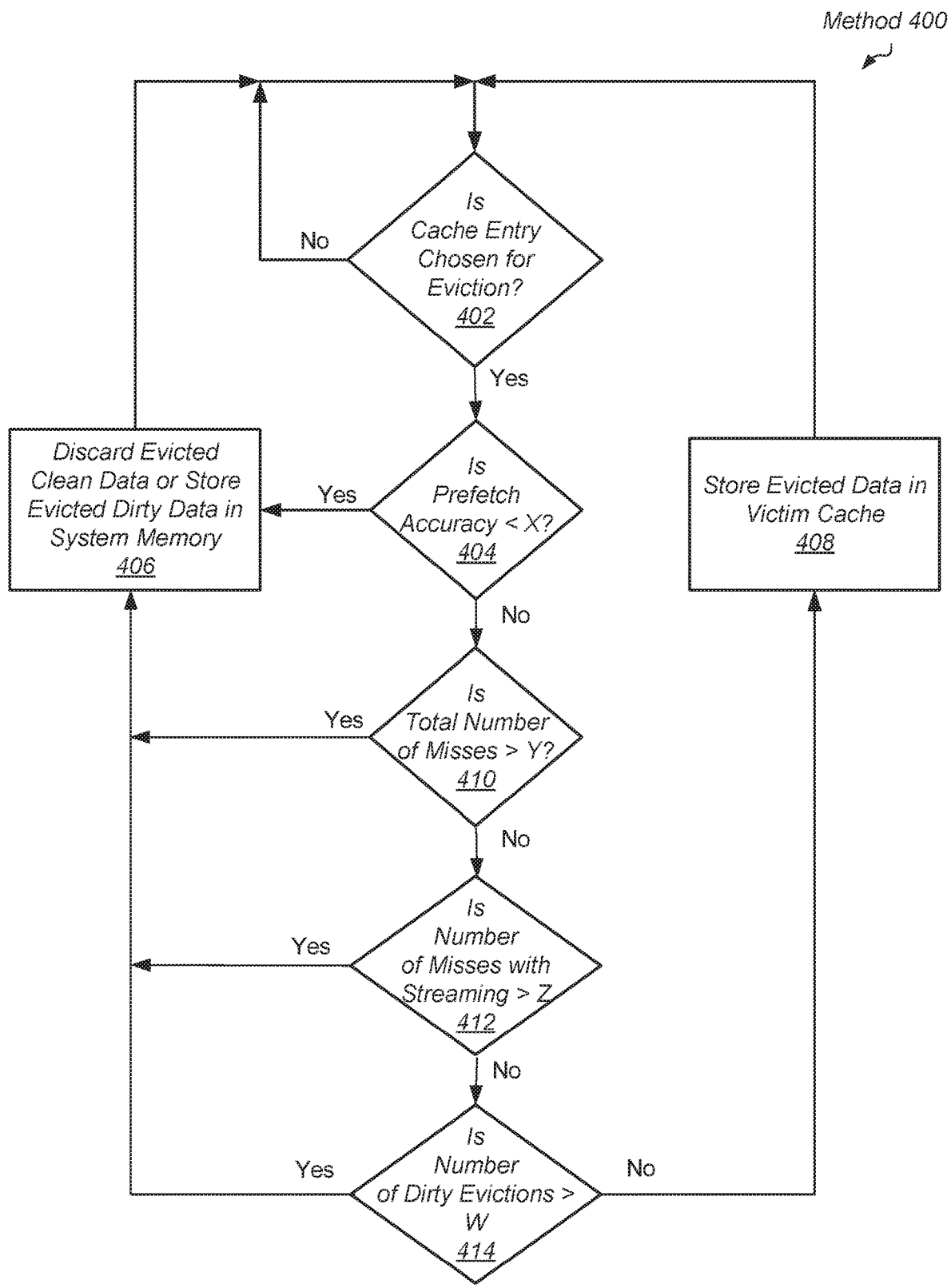
FIG. 4 is a flow diagram of one embodiment of a method for handling evicted data.

Turning now to FIG. 4, a generalized flow diagram of one embodiment of a method 400 for handling evicted data is shown. If it is detected that an entry in a cache, such as a last level cache, is marked for eviction ("yes" branch of the conditional block 402), then the variety of factors described earlier are compared to thresholds. As described earlier, in various embodiments, this variety of factors also determines usefulness of data fetched into the last level cache. In some embodiments, various parameters are used to generate a prefetch accuracy. For example, in some embodiments, control logic determines a ratio of an amount of prefetched data demanded (i.e., hit upon by a demand request) from a particular cache, such as the last level cache, by a processor to an amount of data prefetched into the particular cache. If the prefetch accuracy is less than the corresponding threshold (e.g., a particular value, percentage, etc.), which is indicated as "X" ("yes" branch of the conditional block 404), then the usefulness of data fetched into the particular cache, such as a last level cache, is deemed to be of a lower usefulness and the evicted data is discarded if clean, and bypasses the victim cache for storage in the system memory if dirty (block 406). If the prefetch accuracy exceeds the corresponding threshold, which is indicated as "X" ("no" branch of the conditional block 404), then the usefulness of data fetched into the last level cache is deemed to be of a higher usefulness at least in regard to the prefetch accuracy and other comparisons with other parameters are checked.

If a total number of miss requests sent from the last level cache does not exceed a corresponding threshold, which is indicated as "Y" ("no" branch of the conditional block 410), and if a number of miss requests with a streaming hint (inserted by the prefetcher) sent from the last level cache does not exceed a corresponding threshold, which is indicated as "Z" ("no" branch of the conditional block 412), and if a number of cache entries being evicted with dirty data does not exceed a corresponding threshold, which is indicated as "W" ("no" branch of the conditional block 414), then the usefulness of data fetched into the particular cache, such as the last level cache, is deemed to be of a higher usefulness and control flow of method 400 moves to block 408. In block 408, evicted data in cache entries selected for eviction from the particular cache is stored in the victim cache.

If the total number of miss requests sent from the last level cache exceeds the corresponding threshold, which is indicated as "Y" ("yes" branch of the conditional block 410), or if the number of miss requests with a streaming hint (inserted by the prefetcher) sent from the last level cache exceeds the corresponding threshold, which is indicated as "Z" ("yes" branch of the conditional block 412), or if the number of cache entries being evicted with dirty data exceeds the corresponding threshold, which is indicated as "W" ("yes" branch of the conditional block 414), then the usefulness of data fetched into the particular cache, such as the last level cache, is deemed to be of a lower usefulness and control flow of method 400 moves to block 406. In block 406, evicted clean data in the cache entry is discarded or evicted dirty data is stored in system memory while bypassing the victim cache (i.e., not storing the data in the victim cache). As described earlier, in other embodiments, the comparison results are weighted and combined by any one of a variety of formulas such as a weighted sum.

Figure 5:
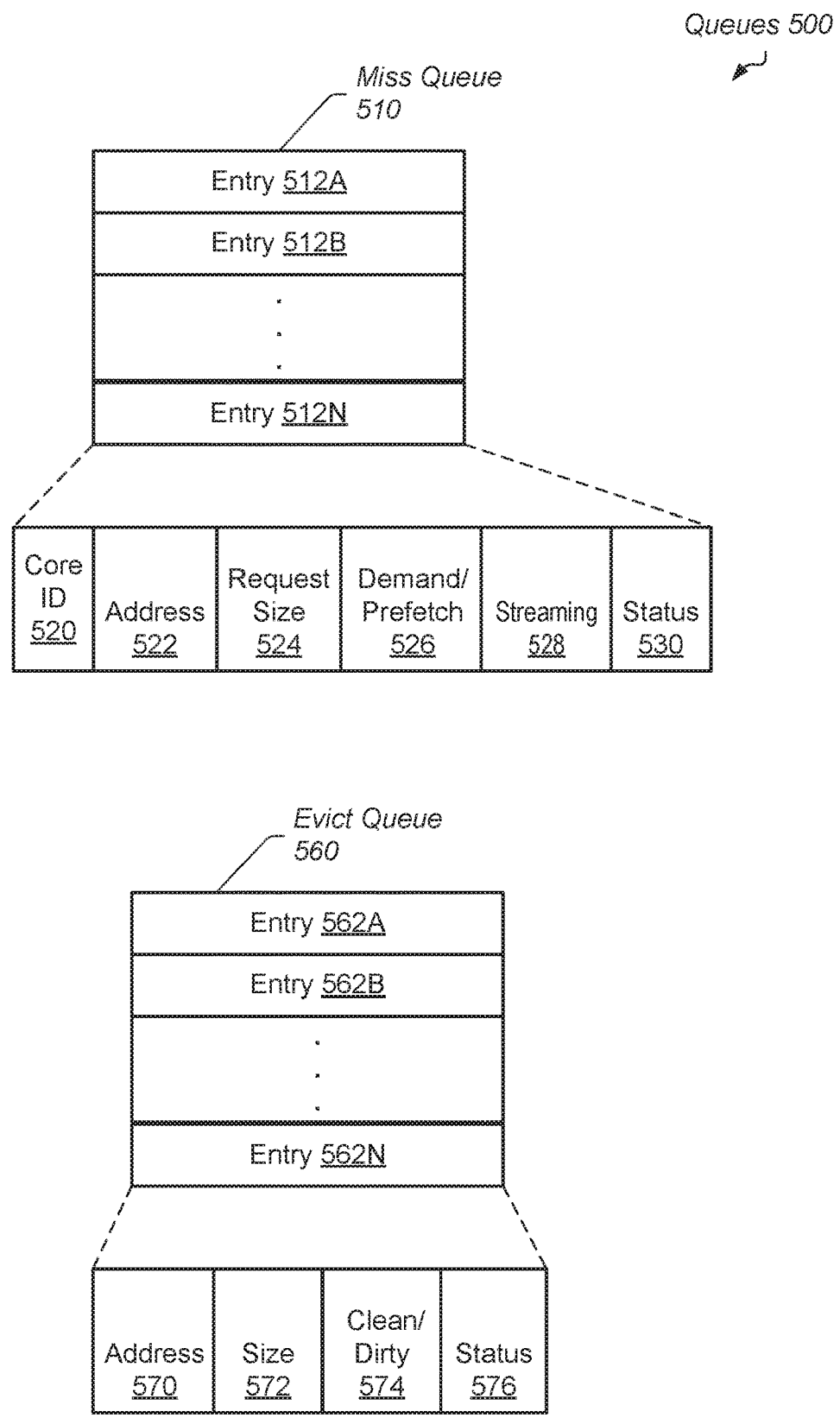
FIG. 5 is a block diagram of one embodiment of a set of queues.

Referring to FIG. 5, a generalized block diagram of one embodiment of queues 500 for storing parameters used for determining handling evicted data is shown. In some embodiments, a cache controller for a last level cache in a processing unit includes miss queue 510 and evict queue 560. Information for outstanding miss requests, which include both demand requests and prefetch requests, for one or more processors are stored in miss queue 510. In some embodiments, the handling of evicted data from the last level cache in a processing unit is based on whether the fetched data is accessed by a processor. Information for data being evicted for a last level cache corresponding to the one or more processors is stored in evict queue 560.

In some embodiments, miss queue 510 includes entries 512A-512N for storing information for outstanding miss requests. Any one of a variety of data storage structures is used for fetch queue 510. For example, data stored in entries 512A-512N are stored in one or more of groups of flip-flops or other types of registers, random access memory (RAM) cells, or a content addressable memory (CAM) structure. Similarly, evict queue 560 with entries 542A-542N uses one of these examples of data storage structures. Control logic for accessing entries 512A-512N and 562A-562N is not shown for ease of illustration.

As shown, in an embodiment, each one of entries 512A-512N includes multiple fields 520-530 for storing information. Similarly, each one of entries 562A-562N includes multiple fields 570-576 for storing information Although fields 520-530 and 570-576 are shown to be placed in a contiguous and particular order, in other embodiments, another order is used as well as one or more other fields are included among the fields being shown.

In the illustrated embodiment, field 520 stores a processor core identifier (ID) for identifying a processor core, field 522 stores a portion or a complete memory address targeting data being demanded or prefetched, and field 524 stores a request size of the data being demanded or prefetched. Field 526 stores an indication specifying whether the corresponding request is a demand request or a prefetch request. In an embodiment, field 526 is updated in cases when a prefetch request has not yet been sent to memory, but a processor has generated a demand request targeting a same memory location. Field 526 transitions from specifying a prefetch request to specifying a demand request. This transition is referred to as a "merge" or a "merged prefetch." In some embodiments, field 526 is updated based on a value stored for the prefetch bit in the cache line, which was described earlier. In an embodiment, field 528 stores an indication specifying whether the corresponding request is hinted at being part of a streaming process by a prefetcher. Field 530 stores status information such as one or more of a valid bit, a quality of service (QoS) parameter, a software process or thread ID, age information, and so forth.

In the illustrated embodiment, field 570 in evict queue 560 stores a portion or a complete memory address targeting data in system memory that had been fetched in to the particular cache, but has also been selected for eviction. Field 572 stores a size of the data selected for eviction. Field 574 stores an indication specifying whether the data selected for eviction is modified, which is also referred to as "dirty," or the selected data is unmodified, which is also referred to as "clean." Field 576 stores status information such as one or more of a valid bit, a software process or thread ID, age information, and so forth.

Figure 6:
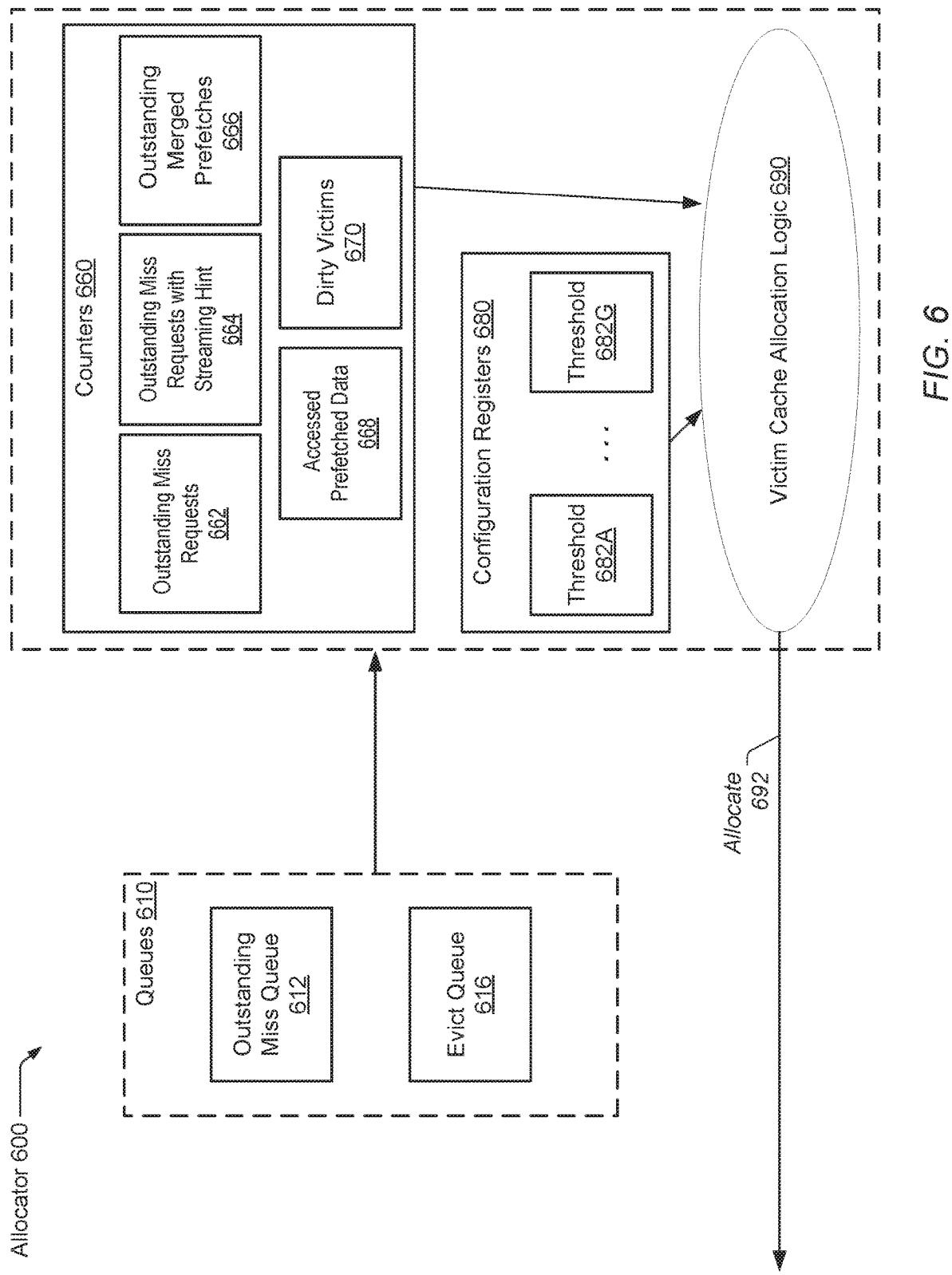
FIG. 6 is a block diagram of one embodiment of an allocator within a prefetcher.

Referring to FIG. 6, a generalized block diagram of one embodiment of an allocator 600 associated with a last level cache of a processor complex is shown. In the illustrated embodiment, allocator 600 includes queues 610, counters 660, configuration registers 680 and victim cache allocation logic 690. As shown, queues 610 includes outstanding miss queue 612 and evict queue 616. In some embodiments, queues 612-616 incorporate the data arrangement and access logic of queues 510 and 560 (of FIG. 5).

In the illustrated embodiment, counters 660 includes counters 662-670 for maintaining different types of parameters. In some embodiments, one or more of the counters 662-670 store values that represent a number of memory access requests of a particular type. One example of a particular type of memory access request is a miss request. As described earlier, miss requests include both demand requests and prefetch requests. Another example of a particular type of memory access request is a missed prefetch request with an asserted streaming hint signal. In other embodiments, the counters 662-670 store values that represent an amount of data measured in bytes, kilobytes or other for memory access requests of a particular type. In yet other embodiments, the counters 662-670 store values that represent a number of valid cache entries, or cache lines (e.g., storage locations) for memory access requests of a particular type. In some embodiments, the counters 662-670 can be reset to given values (e.g., zero). In an embodiment, these counter values 662-670, and any weights associated with the counters 662-670, are stored in configuration registers 680. In an embodiment, the values stored in the counters 662-670 are maintained as accumulated values for a given time period. In an embodiment, when the time period has elapsed, the counters 662-670 are reset to initial values. In another embodiment, when the time period has elapsed, the counters 662-670 are reset to a specified fraction of their current values. In an embodiment, the specified fraction and time period is stored in configuration registers 680. These and other conditions for resetting the counters 662-670 to initial values are possible and are contemplated.

In an embodiment, control logic (not shown) accesses queues 610 for information used to update counters 662-670. In some embodiments, counter 662 stores a value corresponding to outstanding miss requests. In some embodiments, logic (not shown) associated with counters 660 or logic 690 sums the number of valid entries corresponding to outstanding miss requests in queue 612 and updates counter 662 with a value that indicates one of a number of outstanding miss requests or an amount of data in the outstanding miss requests. In an embodiment, counters 664-670 are updated in a similar manner based on entries in one of queues 612-616. In some embodiments, counter 664 stores a value corresponding to outstanding miss requests with a streaming hint (e.g., provided by a prefetcher) and counter 666 stores a value corresponding to outstanding merged prefetches. In some embodiments, counter 668 stores value corresponding to prefetched data both stored in a particular cache and accessed by a processor.

In some embodiments, counter 670 stores a value corresponding to dirty data selected to be evicted. In some embodiments, sending dirty evicted data to the victim cache includes a relatively high cost. For example, the modified data is stored in an L1 cache, rather than in the last level cache (L2). Therefore, the modified data needs to be read from the L1 into the L2 before sending the evicted data to the victim cache. Additionally, in some embodiments, the communication protocol between the allocator and the victim cache includes multiple messages. For example, in an embodiment, a first message is used to inform the victim cache that data is being sent. A second message is a response from the victim cache indicating when to send the data. A third message is sent with the data to allocate in the victim cache. These messages consume resources, such as resources in a communication fabric and controllers, in addition to consuming time. When the amount of dirty data selected to be evicted exceeds a threshold, in some embodiments, the cost is deemed too high and the evicted data is not allocated in the victim cache.

Configuration registers 680 includes registers 682A-682G for storing threshold values and one or more of the above values such as initial values, a time period, weights, credits, a fraction of current values and so on. In some embodiments, each of the thresholds stored in registers 682A-682G is compared to a particular one of the counters 662-670 by victim cache allocation logic 690. Logic 690 includes a combination of combinatorial logic and sequential elements for comparing values stored in counters 662-670 to threshold values stored in registers 682A-682G. In various embodiments, logic 690 generates the allocate hint signal 692. In some embodiments, other logic in the cache controller (not shown) generates outstanding miss addresses pointing to memory locations storing data to speculatively fetch.

In some embodiments, allocate hint signal 692 specifies to external logic whether or not to allocate data being sent from evict queue 616 into a victim cache. In an embodiment, the victim cache is an external shared system cache. As described earlier, in some embodiments, the results of the comparisons performed in logic 690 are weighted and combined by any one of a variety of formulas such as a weighted sum. One embodiment of comparing maintained amounts to thresholds and combining the comparison results is described in previous method 200 (of FIG. 2) and shown in previous method 400 (of FIG. 4). However, a variety of other comparisons and combining of comparison results is possible and contemplated. Any weights for the comparisons are stored in one of logic 690 and configuration registers 680. In one embodiment, if any one of the comparisons determines the usefulness of data fetched into a particular cache, such as a last level cache, is deemed to be of a lower usefulness, and accordingly, no allocation of evicted data should occur in the victim cache, then logic 690 generates such an indication on the allocate hint signal 692. However, if the comparison results determine the usefulness of data fetched into the particular cache, such as the last level cache, is deemed to be of a higher usefulness, then evicted data is allocated in the victim cache, and logic 690 generates such an indication on the allocate hint signal 692.

In some embodiments, one or more of the thresholds stored in configuration registers 680 is a local threshold for a given processor core, rather than a global threshold. For example, when one or more processor cores are inactive, the threshold values change for the comparisons. In one example, two processor cores share a particular global threshold of 24. When one processor core becomes inactive, logic 690 uses a particular local threshold of 12 for the remaining active processor core. Other combinations of local and global thresholds and distributions between local and global thresholds are possible and contemplated.

Turning next to FIG. 7, a block diagram of one embodiment of a system 700 is shown. As shown, system 700 may represent chip, circuitry, components, etc., of a desktop computer 710, laptop computer 720, tablet computer 730, cell or mobile phone 740, television 750 (or set top box coupled to a television), wrist watch or other wearable item 760, or otherwise. Other devices are possible and are contemplated. In the illustrated embodiment, the system 700 includes at least one instance of a system on chip (SoC) 708 which includes multiple processors, each with prefetching logic and allocation control logic for handling evicted data from the processor. For example, in some embodiments, SoC 706 includes processor complexes such as processor complexes 110 and 130 (of FIG. 1). In various embodiments, SoC 706 is coupled to external memory 702, peripherals 704, and power supply 708.

A power supply 708 is also provided which supplies the supply voltages to SoC 706 as well as one or more supply voltages to the memory 702 and/or the peripherals 704. In various embodiments, power supply 708 represents a battery (e.g., a rechargeable battery in a smart phone, laptop or tablet computer). In some embodiments, more than one instance of SoC 706 is included (and more than one external memory 702 may be included as well).

The memory 702 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAIVIBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 704 include any desired circuitry, depending on the type of system 700. For example, in one embodiment, peripherals 704 includes devices for various types of wireless communication, such as Wi-Fi, Bluetooth, cellular, global positioning system, etc. In some embodiments, the peripherals 704 also include additional storage, including RAM storage, solid state storage, or disk storage. The peripherals 704 include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist including a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a first cache configured to store data fetched from a memory;
   a system cache configured to store data evicted from the first cache; and
   circuitry configured to:
     detect given data stored in an entry within the first cache is to be evicted;
     evict the given data from the first cache;
     store the given data that has been evicted from the first cache in the system cache based at least in part on a determination that a usefulness of data fetched into the first cache, other than the given data, exceeds a threshold; and
     bypass storing the given data that has been evicted from the first cache in the system cache based at least in part on a determination that the usefulness does not exceed a threshold.

2. The apparatus as recited in claim 1, wherein said usefulness of data fetched into the first cache is deemed to be of a:
   higher usefulness based at least in part on a determination that a number of outstanding miss requests does not exceed a corresponding threshold, and
   lower usefulness based at least in part on a determination that the number of outstanding miss requests exceeds the corresponding threshold.

3. The apparatus as recited in claim 2, further comprising a storage structure configured to:
   store an indication as to whether portions of data fetched into the first cache correspond to prefetched data or demand fetched data; and
   store an indication as to whether prefetched data stored in the first cache has been accessed by the processor.

4. The apparatus as recited in claim 1, wherein to determine the usefulness, the circuitry is configured to:
   measure a plurality of factors;
   compare each of the plurality of factors to a corresponding threshold to generate a plurality of comparison results; and
   combine the plurality of comparison results in a weighted sum.

5. The apparatus as recited in claim 3, wherein the circuitry is configured to:
   access the storage structure to determine a ratio of an amount of prefetched data stored in the first cache that has been accessed by the processor to the amount of prefetched data stored in the first cache; and
   compare the ratio to a corresponding threshold.

6. The apparatus as recited in claim 2, wherein said usefulness of data fetched into the first cache is deemed to be of a:
   higher usefulness based at least in part on a determination that an amount of data to fetch in outstanding miss requests does not exceed a corresponding threshold, and
   lower usefulness based at least in part on a determination that the amount of data to fetch in outstanding miss requests exceeds the corresponding threshold.

7. The apparatus as recited in claim 2, wherein said usefulness of data fetched into the first cache is deemed to be of a:

higher usefulness based at least in part on a determination that an amount of data to fetch in outstanding miss requests with a streaming hint does not exceed a corresponding threshold, and lower usefulness based at least in part on a determination that the amount of data to fetch in outstanding miss requests with a streaming hint exceeds the corresponding threshold.

8. The apparatus as recited in claim 2, wherein the circuitry is configured to:

store the given data in the system cache based at least in part on a determination that an amount of data to evict that is dirty does not exceed a corresponding threshold; and store the given data in the memory while bypassing the system cache based at least in part on a determination that the amount of data to evict that is dirty exceeds the corresponding threshold.

9. A method, comprising:

storing, by a first cache, data fetched from a memory;

storing, by a system cache, data evicted from the first cache;

detecting, by circuitry, first data stored in a first entry within the first cache is to be evicted;

determining, by the circuitry, a usefulness of data fetched into the first cache including data other than the first data;

evicting, by the circuitry, the first data from the first cache;

storing, by the circuitry, the first data that has been evicted from the first cache in the system cache, in response to determining the usefulness exceeds a threshold.

10. The method as recited in claim 9, wherein said usefulness of data fetched into the first cache is deemed to be of a:

higher usefulness based at least in part on determining a number of outstanding miss requests does not exceed a corresponding threshold, and lower usefulness based at least in part on determining the number of outstanding miss requests exceeds the corresponding threshold.

11. The method as recited in claim 10, further comprising:

storing, by a storage structure, an indication as to whether portions of data fetched into the first cache correspond to prefetched data or demand fetched data; and storing, by the storage structure, an indication as to whether prefetched data stored in the first cache has been accessed by the processor.

12. The method as recited in claim 11, wherein to determine the usefulness, the method further comprises:

measuring a plurality of factors;

comparing each of the plurality of factors to a corresponding threshold to generate a plurality of comparison results; and combining the plurality of comparison results in a weighted sum.

13. The method as recited in claim 11, further comprising:

accessing, by the circuitry, the storage structure to determine a ratio of an amount of prefetched data stored in the first cache that has been accessed by the processor to the amount of prefetched data stored in the first cache; and comparing, by the circuitry, the ratio to a corresponding threshold.

14. The method as recited in claim 10, wherein said usefulness of data fetched into the first cache is deemed to be of a:

higher usefulness based at least in part on determining an amount of data to fetch in outstanding miss requests does not exceed a corresponding threshold, and lower usefulness based at least in part on determining the amount of data to fetch in outstanding miss requests exceeds the corresponding threshold.

15. The method as recited in claim 10, wherein said usefulness of data fetched into the first cache is deemed to be of a:

higher usefulness based at least in part on determining an amount of data to fetch in outstanding miss requests with a streaming hint does not exceed a corresponding threshold, and lower usefulness based at least in part on determining the amount of data to fetch in outstanding miss requests with a streaming hint exceeds the corresponding threshold.

16. The method as recited in claim 9, further comprising:

detecting, by the circuitry, second data stored in a second entry within the first cache is to be evicted;

determining, by the circuitry, a given usefulness of data fetched into the first cache including data other than the second data;

evicting, by the circuitry, the second data from the first cache; and bypassing, by the circuitry, storing of the second data that has been evicted from the first cache in the system cache, in response to determining the given usefulness does not exceed a threshold.

17. A computing system comprising:

a memory;

a first cache configured to store data fetched from the memory;

a system cache configured to store data evicted from the first cache; and a prefetcher configured to:

detect given data stored in an entry within the first cache is to be evicted;

evict the given data from the first cache;

store the given data that has been evicted from the first cache in the system cache based at least in part on a determination that a usefulness of data fetched into the first cache, other than the given data, exceeds a threshold; and bypass storing the given data that has been evicted from the first cache in the system cache based at least in part on a determination that the usefulness does not exceed a threshold.

18. The computing system as recited in claim 17, wherein the computing system further comprises a processor, and wherein said usefulness of data fetched into the first cache is deemed to be of a:

higher usefulness based at least in part on determining a number of outstanding miss requests does not exceed a corresponding threshold, and lower usefulness based at least in part on determining the number of outstanding miss requests exceeds the corresponding threshold.

19. The computing system as recited in claim 18, wherein said usefulness of data fetched into the first cache is deemed to be of a:

higher usefulness based at least in part on determining an amount of data to fetch in outstanding prefetch requests does not exceed a corresponding threshold, and lower usefulness based at least in part on determining the amount of data to fetch in outstanding prefetch requests exceeds the corresponding threshold.

20. The computing system as recited in claim 18, wherein said usefulness of data fetched into the first cache is deemed to be of a:
- higher usefulness based at least in part on determining an amount of data to fetch in outstanding miss requests does not exceed a corresponding threshold, and
- lower usefulness based at least in part on determining the amount of data to fetch in outstanding miss requests exceeds the corresponding threshold.

\* \* \* \* \*